US005619205A

United States Patent [19]

Johnson

[11] Patent Number: 5,619,205

[45] Date of Patent: Apr. 8, 1997

[54] MICROARC CHAFF

[75] Inventor: Richard N. Johnson, Adelphi, Md.

[73] Assignee: The United States of America as represented by the Secretary of the Army, Washington, D.C.

[21] Appl. No.: 797,390

[22] Filed: Sep. 25, 1985

[51] Int. Cl.[6] .............................. H04K 3/00; G01S 7/38

[52] U.S. Cl. .............................. 342/12

[58] Field of Search .............................. 343/18; 342/12

[56] References Cited

U.S. PATENT DOCUMENTS 3,725,927 4/1973 Fiedler .............................. 342/12

3,952,307 4/1976 Nagler .............................. 342/12

*Primary Examiner*—Daniel T. Pihulic

*Attorney, Agent, or Firm*—Freda L. Krosnick; Muzio B. Roberto

[57] ABSTRACT

An improved chaff in which a plurality of metallic or metallic coated elements are joined as chain links that, when deployed, produce microarcs when the link elements make and break contact with each other in an electromagnet field such as that created by a high power radar transmitter. These microarcs will then in turn create current spikes that will reflect a radar signal that has a wider bandwidth than conventional chaff, so as to make it more difficult to distinguish the chain link chaff from a fast moving target such as an aircraft.

11 Claims, 1 Drawing Sheet

MICROARC CHAFF

BACKGROUND OF THE INVENTION

The invention described herein may be manufactured and used by or for the Government for governmental purposes, without the payment of any royalty thereon.

The present invention relates to a means generally known as chaff, which is utilized to interfere with electronic radar devices by creating false target information to confuse enemy radar systems. Conventional chaff is normally comprised of foils or strips of metal or other suitable electrically reflective material. It is dropped from aircraft, or dispersed from rockets shells or the like to provide the false signals to enemy radar systems by attenuation or reflection in order to create decoys for the real target.

A problem, however, occurs in that the bandwidth of the reflected radar signal of conventional chaff will differ from that of a fast moving target such as an airplane or missile due to the doppler effect created by the fast moving target. Thus, a chaff that will produce a wider band reflected radar signal is needed to prevent enemy radar systems from distinguishing the chaff from a fast moving target by compensating for the doppler effect of the moving target.

The primary objective of this invention is an improved chaff that produces microarcs of current in an electromagnetic field by an intermittent make-break contact between the conductive surfaces of the chaff, so as to make the chaff appear as a faster moving target on an enemy radar screen, thereby aiding in foiling the detection of the real target.

SUMMARY OF THE INVENTION

The invention in this case comprises an improved radar chaff in which a plurality of metallic coated foils of electroconductive materials that are responsive to radio frequency energy are joined as chain links. By joining the chaff elements in this manner, as the joined chaff elements are dispersed and fall, an intermittent make and break contact is caused between the conductive surfaces of the chaff elements thereby creating microarcs of current when subjected to an electromagnetic field. The bandwidth of the microarc current spikes thus generated should be adequate to generate-out-of-band jamming and register as a false reading upon an enemy radar screen. The false radar screen reading caused by the microarc current spikes would make the chaff appear as a moving object on the enemy radar screen.

BRIEF DESCRIPTION OF THE DRAWINGS

Further details are explained below with the help of the examples illustrated in the attached drawings in which.

DESCRIPTION OF THE PREFERRED EMBODIMENT

Figure 1:
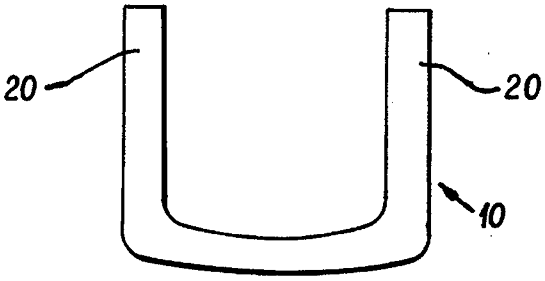
FIG. 1 is a single element of chaff of the radar reflective structure.
Figure 3:
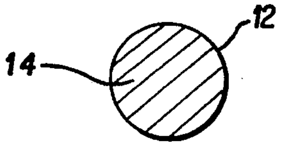
FIG. 3 is a cross section of an element of chaff that is solid metal.
Figure 4:
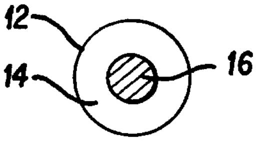
FIG. 4 is a cross section of an element of chaff in which a non-metallic core is metal coated.

In accordance with the teaching of this invention, FIG. 1 shows a single dipole element of chaff designated generally at 10. The chaff element has an outer surface 12 as shown in FIG. 3. The outer surface 12 is made of a material capable of reflecting incident electromagnetic radiation, such as radar signals, back to its source. Magnesium, copper, tin, and zinc are illustrative of some of the more common materials from which outer surface 12 could be made. It should be noted that the chaff could be formed from a solid metal chaff element 14 as is shown in FIG. 3, or it could be formed from a non-metallic material 16, such as glass fiber or plastic, that is coated with a metallic material 14 as is shown in FIG. 4.

Figure 5:
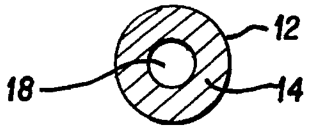
FIG. 5 is a cross section of an element of chaff which has a hollow center.

The overall size or physical dimensions of the chaff elements will be dependent upon the wave length of the primary radar or radio signal for which interference is sought. The length of the chaff should be the wave length of the primary signal or some multiple thereof. The width of the chaff element can be in the range of 1 mil to approximately 10 mils, however, this range can be exceeded at the sacrifice of the chaff losing good airfoil properties such as the length of time the chaff will remain airborn. Another consideration to improve airfoil characteristics may be to make the chaff element's interior a hollow cavity 18 as is shown in FIG. 5.

Figure 2:
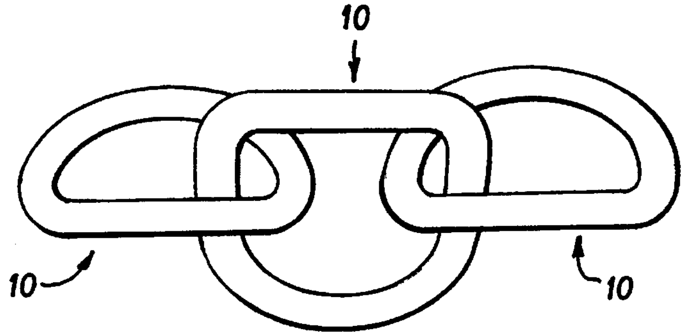
FIG. 2 is a view showing several elements of chaff joined as chain links.
Figure 6:
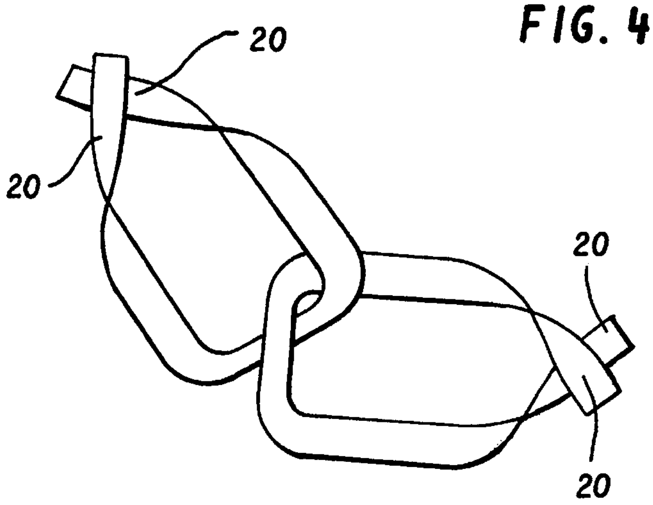
FIG. 6 shows another embodiment by which elements of chaff may be joined.

FIG. 2 shows several individual elements of chaff joined as chain links. In one embodiment the legs 20 of the individual elements of chaff as shown in FIG. 1 are interlocked and twisted together like ties for trash bags as is shown in FIG. 6.

In operation, several interconnected chain links of chaff are deployed about and around the real target to be protected such as an airplane or ship. The chaff can be dispersed by dropping it from an aircraft, or launching it from rockets, shells or other suitable means. As the chaff falls radio waves sent out by enemy radar will be reflected back to the radar receiver by the chaff to create decoys for the real target. However, for conventional chaff, sophisticated moving target indication (MTI) radar systems have the ability to distinguish the slower moving chaff from fast moving targets like aircraft because of the doppler effect upon radar signals caused by the velocity of the aircraft. The distinct advantage the chaff of the present invention has over conventional chaff is that the intermittent make-break contact between the conductive surfaces 12 of the individual chaff chain links 10, as shown in FIG. 2, cause microarcs when the two conductors are scraped across each other in an electromagnetic field, such as the electromagnetic field created by any high power transmitter such as those used in air surveillance radars. These microarcs will then in turn create current spikes that will reflect a radar signal to an enemy radar that has a wider bandwidth than that of conventional chaff, thereby making it more difficult for any enemy radar system to distinguish the reflected signal received by the slower moving chaff from the signal received from fast moving aircraft.

While I have described and shown the particular embodiments of my invention, it will be understood that many modifications may be made without departing from the spirit thereof, and I contemplate by the appended claims to cover any such modification as fall within the true spirit and scope of my invention.

What is claimed is:

1. Microarc chaff for interference with electronic waveform information devices comprising:

a plurality of strip-like elements of electroconductive materials that are responsive to radio frequency energy, said elements being joined as chain links, the major dimension of which said elements is substantially that of the wave length of the radio frequency of operation.

2. The chaff of claim 1 wherein said elements are comprised of a non-metallic material that is coated with a metallic material.

3. The chaff of claim 2 wherein said non-metallic material is plastic.

4. The chaff of claim 2 wherein said metallic coating has an electroconductive surface.

5. The chaff of claim 2 wherein said elements are comprised of a metallic material.

6. The chaff of claim 5 wherein said metallic material has an electroconductive surface.

7. The chaff of claim 3 wherein said elements contain a break in the metallic material to allow for make-break of contact as said element flexes.

8. The chaff of claim 3 wherein said elements are split to allow make-break contact of the metallic material.

9. Microarc chaff for interference wave-form information devices comprising:

a plurality of strip-like elements of electroconductive materials that are responsive to radio frequency energy, said elements being joined as chain links, the major dimension of which said elements is substantially that of the wave length of the radio frequency of operation;

wherein when said chaff is deployed about a target, intermittent make and break contact between the conductive surfaces of the individual chaff elements cause microarcs that create current spikes in an electromagnetic field of a radar transmitter that will reflect a radar signal to an enemy radar that has a wider bandwidth than conventional chaff, so as to make the chain link type chaff appear as a faster moving target than conventional chaff.

10. The chaff of claim 9 wherein the width of the chaff is less than ten mils so as to allow the chaff to exhibit good airfoil properties and extend the time the chaff remains airborn.

11. The chaff of claim 9 wherein the chaff element has a hollow interior cavity.

* * * * *